No. 699,521. Patented May 6, 1902.
O. HEINRICHS.
CHURN.
(Application filed Jan. 19, 1901.)
(No Model.)
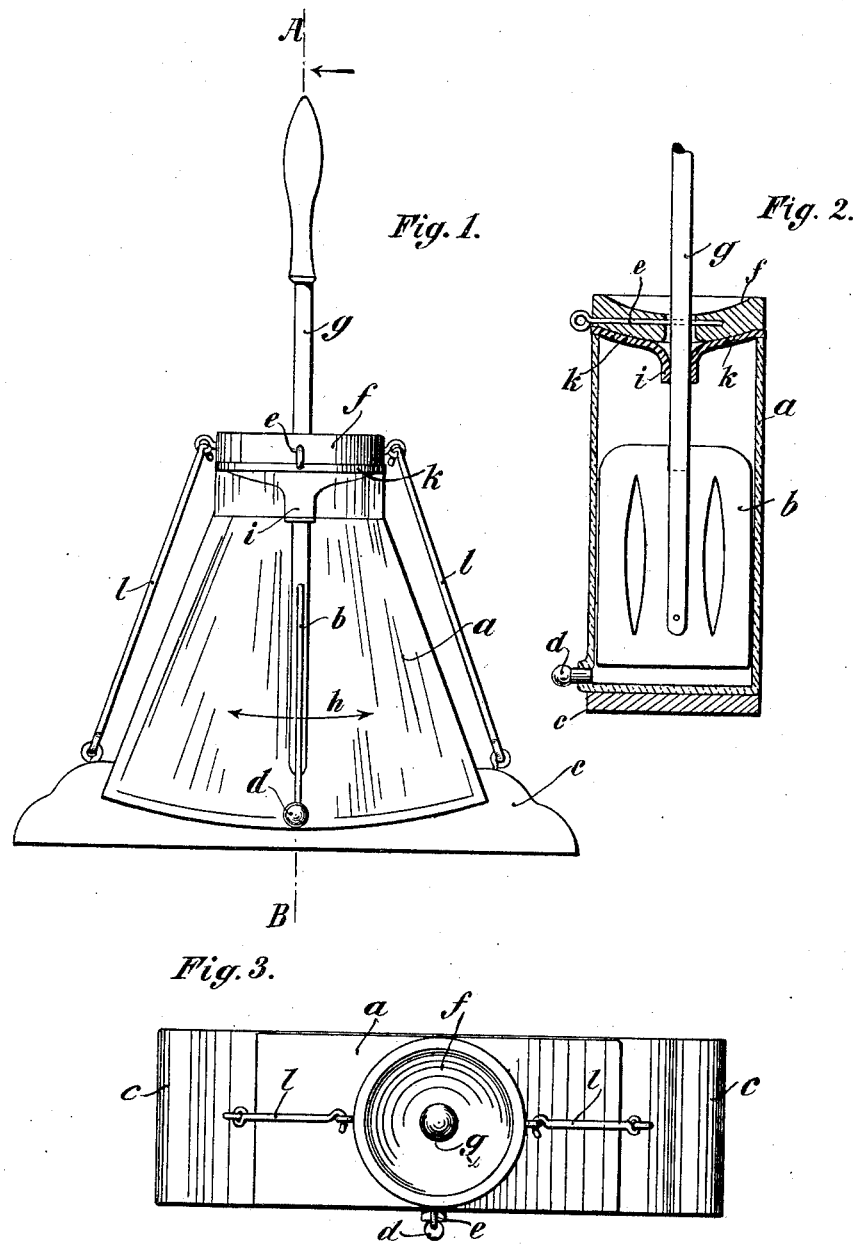
Witnesses:
Inventor
Otto Heinrichs
by Ralph Julian Sachers
his Attorney

UNITED STATES PATENT OFFICE.

OTTO HEINRICHS, OF STUTTGART, GERMANY.

CHURN.

SPECIFICATION forming part of Letters Patent No. 699,521, dated May 6, 1902.

Application filed January 19, 1901. Serial No. 43,942. (No model.)

*To all whom it may concern:*

Be it known that I, OTTO HEINRICHS, dairy proprietor, a subject of the King of Würtemberg, residing at 42 Rotestrasse, Stuttgart, in the Kingdom of Würtemberg and Empire of Germany, have invented certain new and useful Improvements in Churns, of which the following is a full, clear, and exact description.

This invention has reference to churns for making butter or for other purposes, and more particularly to those operated by hand, and has for its object and effect to provide a churn which, while being efficient in operation may be cheaply manufactured.

The churn the subject of this invention mainly consists of a perforated paddle contained in a vessel, preferably of glass or the like, widening wedge-shaped downward, said paddle being moved with a pendulous motion around a pin or bolt passing through the cover of the vessel by means of a handle which protrudes through the cover of the top of the vessel. The opening in the cover of the churn through which the handle of the paddle or blade passes is completely and tightly closed by means of a sleeve of rubber, leather, or the like, the upper portion of which is of disk form, which is secured between the edge of the vessel and the cover by suitable fastening appliances.

One form of carrying out my invention is illustrated in the annexed drawings, in which—

Figure 1 represents a side view of the churn. Fig. 2 is a vertical longitudinal section at A B, Fig. 1, viewed in the direction of the arrow; and Fig. 3 is a plain view from above.

In the drawings, *a* represents the containing vessel, and *b* the paddle or blade. The vessel *a* is of a form widening in a wedge from toward the bottom and rests firmly upon a wooden stand *c*. At the lowest portion of the curved bottom a plug *d* is provided for removing the buttermilk.

The paddle or blade *b* may be perforated in any desired manner—for instance, as shown in Fig. 2—and it is so suspended on a pin or bolt *e*, which passes through the cover *f*, that it may be moved to and fro within the vessel *a* with a pendulous motion by means of a handle *g* in the direction of the double arrows *h*, Fig. 1.

For the purposes of closing the opening between the shaft of the handle *g* and the cover *f* the sleeve *i* is placed around the handle-shaft on the inside of the cover *f*, and its upper edge is formed into a disk *k*, which is secured between the rim of the cover *f* and the vessel *a* by means of two or more draw-hooks *l*. These draw-hooks are suitably secured to the wooden stand and hooked into the eyes disposed on the outer circumference of the cover *f*, so that the cover may be quickly and easily removed when it is desired to take the paddle or blade *b* and the substance churned out of the vessel *a*.

In action by quickly moving to and fro the paddle *b* in the direction of arrow *h*, Fig. 1, cream placed in the vessel *a* may be churned into butter and the buttermilk formed drawn off through tap *d* before the finished butter is taken out of the vessel *a*.

The churn, in addition to working up cream, may also be used for producing the "snow" required by confectioners or various kinds of ices, &c.

It will be understood that the sleeve *i* is made integral with the plate, washer, or cushion *k*, and these parts are made of a suitable material, such as thin rubber, sufficiently flexible to allow the dasher-stem *g* to be moved freely.

The base *c* has a dovetail seat to receive the body *a* of the churn, it being understood that by this construction an upward movement of the churn-body relatively to the base is prevented. The braces *l* hold the body *a* from sliding lengthwise in the dovetail.

What I claim, and desire to secure by Letters Patent, is—

1. The combination of the vessel having a neck, a blade or beater pivoted to oscillate in said vessel and extending through the neck thereof, and a flexible member arranged at the neck and engaging the beater-stem.

2. The combination of the vessel having a neck and a curved bottom, a blade or beater pivoted about an axis extending approximately through the center of curvature of the bottom, said beater having its stem extended through the neck of the vessel, a support for the vessel, a cap for the vessel, a washer or cushion interposed between the cap and the vessel and having a flexible member or sleeve engaging the beater-stem, and braces connecting the support with the cap.

In witness whereof I subscribe my signature in presence of two witnesses.

OTTO HEINRICHS.

Witnesses:
CHRISTIAN WESSNIER.
WM. HAHN.